UNITED STATES PATENT OFFICE.

OTTO E. RUHOFF, OF MADISON, WISCONSIN, ASSIGNOR TO FRENCH BATTERY & CARBON CO., OF MADISON, WISCONSIN, A CORPORATION OF WISCONSIN.

PURIFICATION OF BATTERY MATERIALS.

1,343,585.     Specification of Letters Patent.     Patented June 15, 1920.

No Drawing.     Application filed March 1, 1917. Serial No. 151,716.

*To all whom it may concern:*

Be it known that I, OTTO E. RUHOFF, a citizen of the United States, residing at Madison, in the county of Dane and State of Wisconsin, have invented a certain new and useful Improvement in Purification of Battery Materials, of which the following is a specification.

My invention relates to the manufacture of so-called dry cell batteries such as are utilized for ignition, telephone and flash light purposes.

Natural and artificially prepared compounds of manganese are largely used in connection with the manufacture of dry cell electric batteries, both of the standard sizes used for ignition and telephone purposes, and also for the smaller sizes used for flash-lamps. If these manganese compounds contain small amounts of certain impurities, such as compounds of metals, tals, and certain other substances, in such a form that they are soluble in the battery electrolyte, rapid deterioration of the battery takes place. Some of the impurities more or less commonly found in connection with manganese compounds are arsenic, antimony, cobalt, nickel, copper, cadmium, and compounds of these metals. These impurities may be present not only in the manganese compounds but also in other battery ingredients, such as carbon flour, graphite and so on, and if so present will damage the battery in the same way as if they were contained in the manganese compounds.

The object of this invention is to so treat the manganese compounds or battery material as to remove these impurities, and thus leave the battery material in such a condition that no bad results are produced when it is used in the battery. The invention consists in a simple and inexpensive means of producing this desired result.

In carrying out this invention, the manganese compounds or other battery material is treated with a chemical which will attack the harmful impurities therein to the accomplishment of their ultimate removal therefrom. Suitable reagents for this purpose are dilute acids, such for instance as sulfuric acid and certain salts, such as ammonium chlorid.

In specifically carrying out the invention, it has been my practice to place a suitable quantity of the powdered manganese compounds or other battery material in a suitable receptacle, pour over this a dilute solution; say a five per cent. solution of sulfuric acid. Then stir the mixture with or without heating for from ten minutes to half an hour, during which time the acid acts upon the harmful impurities in the manganese compounds, thus converting them into soluble sulfates. After this the solution thus carrying these impurities is removed by any suitable method, as for instance, by a filter press or decantation. The remaining product, namely, the original material freed from the impurities which were originally present, may be dried or not, as desired. The result of this is that the battery material is free from harmful impurities and the batteries in which it is used are long lived and successful.

Having thus described my invention, what I claim as new and desire to secure by Letters Patent, is:—

1. The method of removing harmful impurities from a manganese oxid ore to prepare the same for use in a dry cell battery mix, consisting of applying to such ore a dilute solution of sulfuric acid, thoroughly mixing said ingredients, and then removing the resulting liquid.

2. The process of removing harmful impurities from a manganese oxid ore to prepare the same for use in a dry cell battery mix, consisting in applying to said ore a chemical reagent which will attack and dissolve the mineral and metallic impurities, allowing sufficient time for such dissolving action to take place, and then removing the solution carrying the impurities.

In witness whereof, I have hereunto subscribed my name in the presence of two witnesses.

OTTO E. RUHOFF.

Witnesses:
H. S. CHENEY,
J. E. BYRNS.